(12) United States Patent
Kagawa et al.

(10) Patent No.: US 9,647,399 B2
(45) Date of Patent: May 9, 2017

(54) CONNECTOR FOR ELECTRICAL CONNECTION

(71) Applicant: Panasonic Intellectual Property Management Co., Ltd., Osaka-shi, Osaka (JP)

(72) Inventors: Takuya Kagawa, Kyoto (JP); Hideki Tamura, Shiga (JP); Kazunori Kidera, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 22 days.

(21) Appl. No.: 14/781,304

(22) PCT Filed: Feb. 19, 2014

(86) PCT No.: PCT/JP2014/000853
§ 371 (c)(1),
(2) Date: Sep. 29, 2015

(87) PCT Pub. No.: WO2014/155948
PCT Pub. Date: Oct. 2, 2014

(65) Prior Publication Data
US 2016/0056589 A1    Feb. 25, 2016

(30) Foreign Application Priority Data

Mar. 29, 2013  (JP) .................................. 2013-071405

(51) Int. Cl.
*H02H 7/00*  (2006.01)
*H01R 13/713*  (2006.01)
(Continued)

(52) U.S. Cl.
CPC ............ *H01R 13/7135* (2013.01); *B60L 3/00* (2013.01); *B60L 3/04* (2013.01); *B60L 11/1809* (2013.01);
(Continued)

(58) Field of Classification Search
USPC .......................................... 361/42
See application file for complete search history.

(56) References Cited

U.S. PATENT DOCUMENTS

| | | | |
|---|---|---|---|
| 8,798,803 B2* | 8/2014 | Bush | H02J 3/14 320/109 |
| 2010/0299008 A1* | 11/2010 | Mitsutani | B60K 6/445 701/22 |

(Continued)

FOREIGN PATENT DOCUMENTS

| | | |
|---|---|---|
| JP | 2010-239827 A | 10/2010 |
| JP | 2012-210007 A | 10/2012 |

(Continued)

OTHER PUBLICATIONS

International Search Report dated Mar. 18, 2014, which issued in International Application No. PCT/JP2014/000853.
(Continued)

*Primary Examiner* — Ronald W Leja
(74) *Attorney, Agent, or Firm* — McDermott Will & Emery LLP (57) ABSTRACT

Connector for electrical connection includes coupler, cable, switch mechanism, failure detector and transmitter. Coupler is removably inserted in and connected to reception side connector provided in machine which is equipped with storage battery. Cable includes two or more electric wires including power line configured to be electrically connected to reception side connector via coupler. Cable is connected to device that performs at least one of supplying power to
(Continued)

machine and receiving power from machine. Switch mechanism opens and closes electrical circuit between coupler and power line. Failure detector detects occurrence of failure of coupler. Transmitter transmits detection result of failure detector to device through at least one first electric wire of the two or more electric wires. Switch mechanism opens and closes the electrical circuit in accordance with control signal transmitted through first electric wire.

4 Claims, 3 Drawing Sheets

(51) Int. Cl.
*B60L 11/18* (2006.01)
*B60L 3/00* (2006.01)
*B60L 3/04* (2006.01)
*H02J 7/00* (2006.01)
*H01R 13/66* (2006.01)

(52) U.S. Cl.
CPC ...... *B60L 11/1818* (2013.01); *H01R 13/6683* (2013.01); *H01R 13/713* (2013.01); *B60L 2240/36* (2013.01); *H01R 13/665* (2013.01); *H02J 7/0029* (2013.01); *Y02T 10/7005* (2013.01); *Y02T 10/7072* (2013.01); *Y02T 90/14* (2013.01)

(56) References Cited

U.S. PATENT DOCUMENTS

| | | | |
|---|---|---|---|
| 2011/0074351 A1* | 3/2011 | Bianco | B60L 11/1816 320/109 |
| 2013/0335024 A1* | 12/2013 | Akai | H01M 10/44 320/109 |
| 2014/0015494 A1 | 1/2014 | Kobayashi et al. | |
| 2015/0263549 A1* | 9/2015 | Lee | H01M 10/48 361/93.4 |
| 2016/0056589 A1* | 2/2016 | Kagawa | H01R 13/713 361/42 |

FOREIGN PATENT DOCUMENTS

| | | |
|---|---|---|
| JP | 2013-008465 A | 1/2013 |
| JP | 2013-027144 A | 2/2013 |
| WO | 2012/111081 A1 | 8/2012 |
| WO | 2013/018738 A1 | 2/2013 |

OTHER PUBLICATIONS

Extended European Search Report issued in corresponding European Patent Application No. 14775051.7, mailed on Feb. 6, 2017.

* cited by examiner

CONNECTOR FOR ELECTRICAL CONNECTION

CROSS-REFERENCE TO RELATED APPLICATIONS

This application is the U.S. National Phase of PCT/JP2014/000853 filed Feb. 19, 2014, which claims priority to Japanese Patent Application No. 2013-071405 filed Mar. 29, 2013. The subject matter of each is incorporated herein by reference in entirety.

TECHNICAL FIELD

The present invention relates to a connector for electrical connection.

BACKGROUND ART

For electrically connecting a machine having a storage battery and a device for suppling electric power for charging to the machine, connectors for electrical connection have been widely used. Conventional examples of such connectors for electrical connection includes a charging connector configured to be connected to a charging inlet of an electric vehicle (see Document 1 (JP2010-239827A) for example).

Document 1 discloses a charger configured to charge a storage battery (on-vehicle battery) equipped in an electric vehicle through a charging connector and a charging cable. This charger has functions configured to detect occurrence of ground fault and occurrence of electric leakage, and is configured to stop supplying electric power to an electric vehicle when detecting occurrence of ground fault or electric leakage.

In recent years, power feeding from a storage battery of an electric vehicle to a load (e.g., light fixture in a residence) outside the vehicle has been increasingly performed. In such a case, the electric vehicle would be electrically connected to a charging-discharging control device via a connector and a cable. The charging-discharging control device would be configured to perform electrical conversion in two directions between an AC power and a DC power, and to control charging of the storage battery and supplying electric power from the storage battery to the load outside the vehicle.

In the conventional example described in Document 1, the charger is dedicated for charging a storage battery of an electric vehicle. It is therefore sufficient to stop supplying power in the inside of the charger, when a failure such as ground fault or electric leakage occurs.

However, in a case where electric power is discharged from a storage battery of an electric vehicle to an outside of the vehicle, even when a power feeding path from the storage battery is broken in a charging-discharging control device, the connector is still in connection with the storage battery. It is therefore desired to further improve the safety of a connector and a cable.

SUMMARY OF INVENTION

The present invention has been achieved in view of the above circumstances, and an object thereof is to improve the safety when a failure occurs.

A connector for electrical connection according to the first aspect of the present invention includes a coupler, a cable, a switch mechanism, a failure detector, a transmitter and a housing. The coupler is configured to be removably inserted in and connected to a reception side connector provided in a machine which is equipped with a storage battery. The cable includes two or more electric wires that include a power line configured to be electrically connected to the reception side connector via the coupler. The cable is configured to be connected to a device that is configured to perform at least one of supplying electric power to the machine and receiving electric power from the machine. The switch mechanism is configured to open and close an electrical circuit between the coupler and the power line. The failure detector is configured to detect an occurrence of a failure of the coupler. The transmitter is configured to transmit a detection result of the failure detector to the device through at least one first electric wire of the two or more electric wires. The housing is provided at an end of the cable. The coupler, the switch mechanism, the failure detector and the transmitter are housed in the housing. The switch mechanism is configured to open and close the electrical circuit in accordance with a control signal transmitted through the first electric wire.

The connector for electrical connection according to the second aspect of the present invention is realized in combination with the first aspect, and the failure detector is configured to detect two or more kinds of failures individually. Further, the transmitter is configured to transmit, as one unified result, at least two kinds of failures of the two or more kinds of failures to the device.

The connector for electrical connection according to the third aspect of the present invention is realized in combination with the first aspect, and the failure detector and the switch mechanism are configured to operate with electric power supplied from the device through at least one second electric wire of the two or more electric wires.

The connector for electrical connection according to the fourth aspect of the present invention is realized in combination with the first aspect, and the failure detector and the switch mechanism are configured to operate with electric power supplied through the electrical circuit.

DESCRIPTION OF EMBODIMENTS

Hereinafter, it is explained an embodiment in which the technical concept of the present invention is applied to a connector which is configured to be removably inserted in and connected to an inlet (reception side connector) provided in an electric vehicle (machine) equipped with an on-vehicle battery (storage battery) and which is adapted for charging the on-vehicle battery and power feeding from the on-vehicle battery to a load outside the vehicle. However, a machine equipped with a storage battery is not limited to an electric vehicle, but may be, for example, a stationary storage device configured to store energy generated by a solar cell or a fuel cell.

Figure 1:
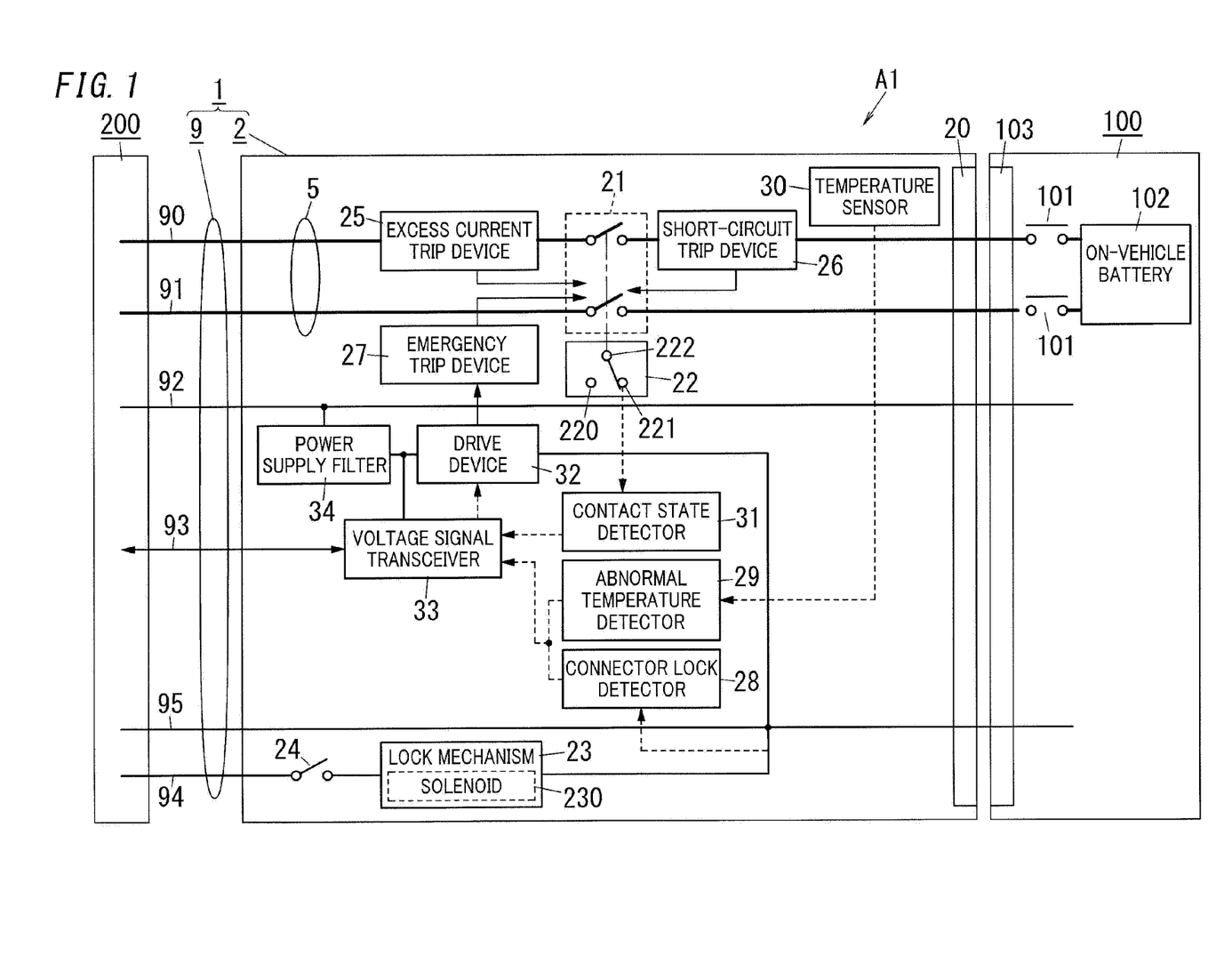
FIG. 1 is a system configuration diagram of a charging-discharging system that includes a connector for electrical connection according to an embodiment of the invention.

FIG. 1 shows a system configuration diagram of a charging-discharging system A1 that includes a connector for electrical connection 1 (hereinafter, referred to as "connector") according to the present embodiment. The charging-discharging system A1 is constituted by an electric vehicle 100 equipped with an on-vehicle battery 102 (storage battery), a charging-discharging control device 200 and the connector 1.

The charging-discharging control device 200 (device) is configured to perform supplying electric power to the electric vehicle 100 (machine) and receiving electric power from the electric vehicle 100. However, the charging-discharging control device 200 (device) may be configured to perform supplying electric power to the electric vehicle 100 (machine) only, or configured to perform receiving electric power from the electric vehicle 100 only. The charging-discharging control device 200 includes a converter (not shown) configured to convert an AC voltage/current supplied from a commercial power grid into a DC voltage/current. Also, the charging-discharging control device 200 includes an inverter (not shown) configured to convert a DC voltage/current supplied from the on-vehicle battery 102 into an AC voltage/current and the like. Also, the charging-discharging control device 200 has a function configured to adjust an output of the converter/inverter according to an instruction from the electric vehicle 100, a function configured to detect an occurrence of a failure such as ground fault and/or electric leakage and to stop the operation of the converter and the inverter, and the like.

The electric vehicle 100 includes, in addition to the on-vehicle battery 102 for providing driving power, a sub-battery (not shown) for an electronic control unit (ECU) (not shown) that is configured to perform communication with the charging-discharging control device 200 and the like. The electric vehicle 100 is provided with an inlet 103 (reception side connector) that includes an interface in conformity with a standard specification (TS D 0007: Basic function of quick charger for the electric vehicle) issued by Japanese Standards Association. The inlet 103 includes: two electrodes for power supply configured to be individually connected to an anode and a cathode of the on-vehicle battery 102; two electrodes for communication adapted for controller area network (CAN) communication; four electrodes for signal transmission adapted for transmission of analog signals; and an earth electrode for grounding. Contactors (electromagnetic contactors) 101 exist between the two electrodes for power supply and the anode and the cathode of the on-vehicle battery 102. These contactors 101 are opened and closed under control of the electronic control unit of the electric vehicle 100.

Figure 2:
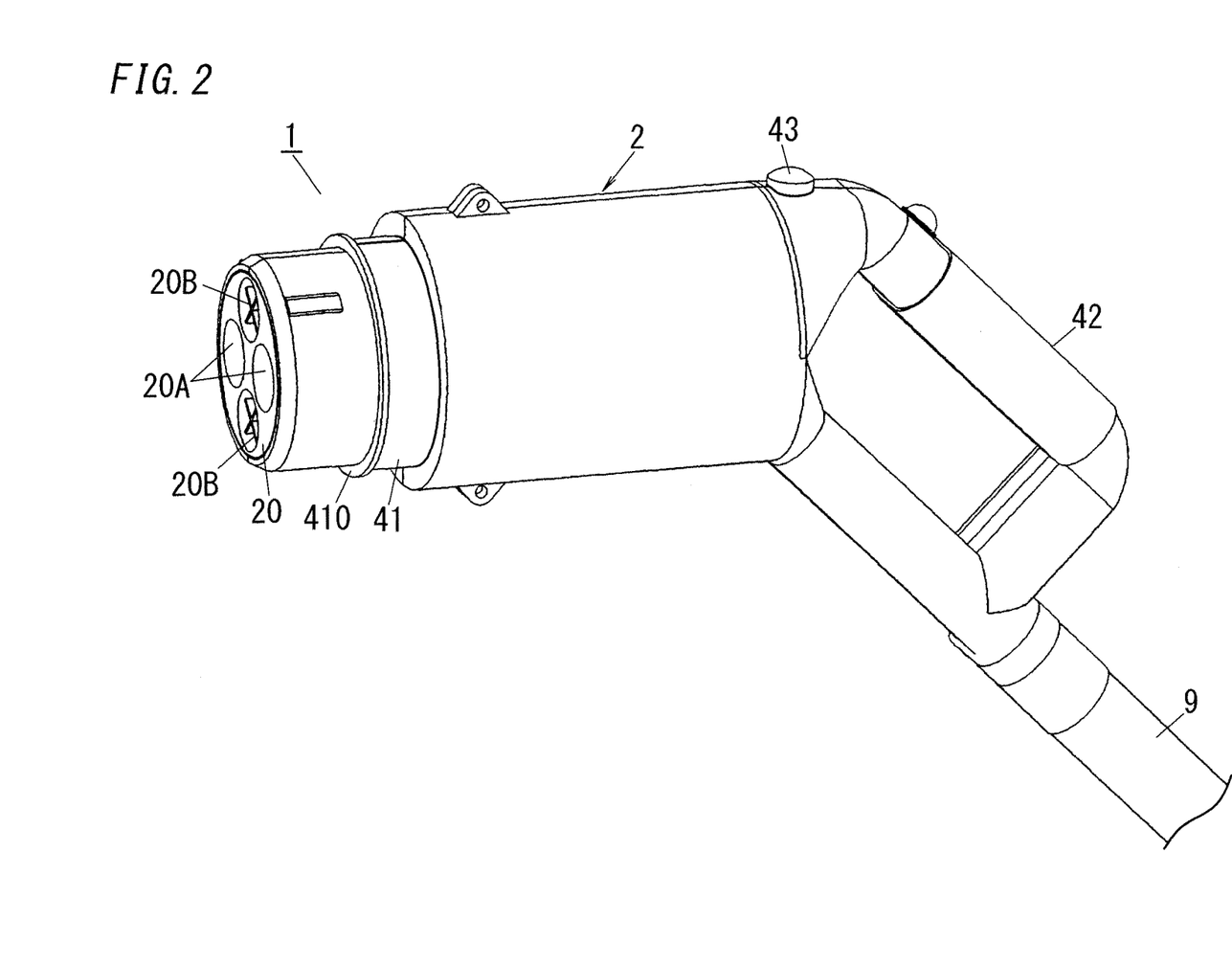
FIG. 2 is an external perspective view of the connector for electrical connection according to the embodiment of the invention.

As shown in FIG. 2, the connector 1 is constituted by a connector main body (hosing) 2 and a cable 9. The cable 9 is an eleven-core electric cable, and includes two power lines 90 and 91, two CAN communication lines (not shown), total six transmission lines 92, 93, 94 (some of the transmission lines are not shown), and a grounding line 95 (see FIG. 1). The connector main body 2 is provided at a first end of the cable 9, while a second end of the cable 9 is connected to the charging-discharging control device 200. In other words, the cable 9 includes two or more electric wires that include the power lines 90 and 91 configured to be electrically connected to the inlet 103 (reception side connector) through a coupler 20. The cable 9 is connected to the charging-discharging control device 200 (device). Hereinafter, in a center axis direction of the connector main body 2 shown in FIG. 2, a side of the coupler 20 relative to the connector main body 2 is referred to as "front" side, and a side of a handle 42 relative to the connector main body 2 is referred to as "rear" side.

The connector main body 2 is shaped like a circular cylinder as a whole. The coupler 20 is provided at the front end of the connector main body 2, while the handle 42 is provided at the rear end of the connector main body 2. The coupler 20 is configured to be removably inserted in and connected to the inlet 103 (reception side connector) of the electric vehicle 100 (machine equipped with a storage battery). Four round holes 20A and 20B open in a front face of the coupler 20. In each of spaces inside relatively large two round holes 20A, a contact for power supply (not shown) connected to a main circuit (electrical circuit) 5 is housed. Each of spaces inside relatively small two round holes 20B is partitioned into four segments, and contacts for transmission and grounding (not shown) are disposed in the segments individually.

A cylinder body 41 shaped like a circular cylinder is provided on the rear side of the coupler 20 so as to be free to move in the front-rear direction. The coupler 20 is disposed inside the cylinder body 41. An outer flange 410 is provided on a front end of the cylinder body 41. The outer flange 410 is biased frontward by a spring force of a spring (not shown) disposed inside the connector main body 2. When the coupler 20 is inserted in the inlet 103 in order to be connected thereto, the outer flange 410 is pressed by a surface of the inlet 103 and thus the cylinder body 41 moves rearward. As a result, engagement claws, which are retreated inside the connector main body 2 by being pressed by the cylinder body 41, pop up to the outside of the connector main body 2 to be engaged with engagement recesses (not shown) of the inlet 103. However, the shape and structure of the cylinder body 41 are not limited to those of the present embodiment. When a release button 43 on the connector main body 2 is operated (pressed), the engagement claws retreat inside the connector main body 2 and thus the engagement with the engagement recesses is cancelled. Further, a switch (detection switch) 24 (see FIG. 1) is disposed in the connector main body 2. The switch 24 is configured to be turned off when the engagement claws are retreated inside the connector main body 2, and be turned on when the engagement claws appear outside the connector main body 2. That is, the detection switch 24 is configured to be turned on when the coupler 20 is successfully connected to the inlet 103.

The connector main body 2 is provided therein with a lock mechanism 23 (see FIG. 1 and FIG. 3) configured to lock the engagement claws to forbid the engagement claws from being retreated inside the connector main body 2, in order to prevent occurrence of the disengagement between the engagement claws and the engagement recesses caused by undesired operation (pressing) of the release button 43 during charging operation. The lock mechanism 23 includes a solenoid 230 (solenoid actuator). The solenoid 230 includes a coil 231 (solenoid coil) and a plunger (not shown). In the solenoid 230, when the detection switch 24 is turned on and a checkup before the charging/discharging allows a charging/discharging operation, the coil 231 is supplied with a drive current from the charging-discharging control device 200 through the transmission line 94 and the grounding line 95 to drive the plunger (see FIG. 1 and FIG. 3). As a result, the plunger restricts the movement of the engagement claws. Therefore, when the lock mechanism 23 is enabled, the engagement between the engagement claws and the engagement recesses cannot be cancelled manually. On the other hand, when the lock mechanism 23 is disabled, the engagement between the engagement claws and the engagement recesses can be manually cancelled by the pressing operation on the release button 43.

As shown in FIG. 1, main-contacts 21, sub-contacts 22, an excess current trip device 25, a short-circuit trip device 26 and an emergency trip device 27 are housed in the connector main body 2. In addition to the above, a connector lock detector 28, an abnormal temperature detector 29, a temperature sensor 30, a contact state detector 31, a drive device 32, a voltage signal transceiver 33, a power supply filter 34 and the like are housed in the connector main body 2. In other words, the connector main body 2 (hosing) is provided at an end of the cable 9, and the coupler 20, the switch mechanism, a failure detector and the voltage signal transceiver 33 (transmitter) are housed in the connector main body 2. The switch mechanism is constituted by the main-contacts 21, a mechanical open-close mechanism, the emergency trip device 27 and the drive device 32, as described later. The failure detector is constituted by the connector lock detector 28 and the abnormal temperature detector 29, as described later.

The main-contacts 21 are included in the main circuit (electrical circuit) 5 that allows a charging current and a discharging current of the on-vehicle battery 102 to flow through. The mechanical open-close mechanism (not shown) is provided in the connector main body 2, and is configured to allow the main-contacts 21 to close when the coupler 20 is connected to the inlet 103 and to cause the main-contacts 21 to open when the coupler 20 is disconnected from the inlet 103. Such kinds of open-close mechanism are well-known in the technical field of circuit breaker and the like, and thus detailed illustration and description thereof will not be provided herein.

The sub-contacts 22 include two change-over contacts 220 and 221, and a common contact 222. The sub-contacts 22 are configured such that the connection of the common contact 222 is switched to either of the change-over contact 220 or 221 along with the operation of the main-contacts 21. The contact state detector 31 is configured to detect the state (opened state and closed state) of the main-contacts 21 based on the switched state of the sub-contacts 22, and to output the detection result to the voltage signal transceiver 33.

The excess current trip device 25 is configured to operate the open-close mechanism to trip (open) the main-contacts 21 when detecting that an excess current flows through the main circuit (electrical circuit) 5 for a predetermined time or more. The short-circuit trip device 26 is configured to operate the open-close mechanism to trip the main-contacts 21 when detecting that a short-circuit current flows through the main circuit (electrical circuit) 5. The emergency trip device 27 is configured to operate the open-close mechanism to trip the main-contacts 21 when being driven by the drive device 32. The excess current trip device 25, the short-circuit trip device 26, the emergency trip device 27 and the drive device 32 can be realized based on the well-known techniques in the technical field of circuit breaker and the like, and thus detailed illustration and description thereof will not be provided herein. In the connector 1 of the present embodiment, the main-contacts 21, the open-close mechanism, the emergency trip device 27 and the drive device 32 constitute the switch mechanism.

Figure 3:
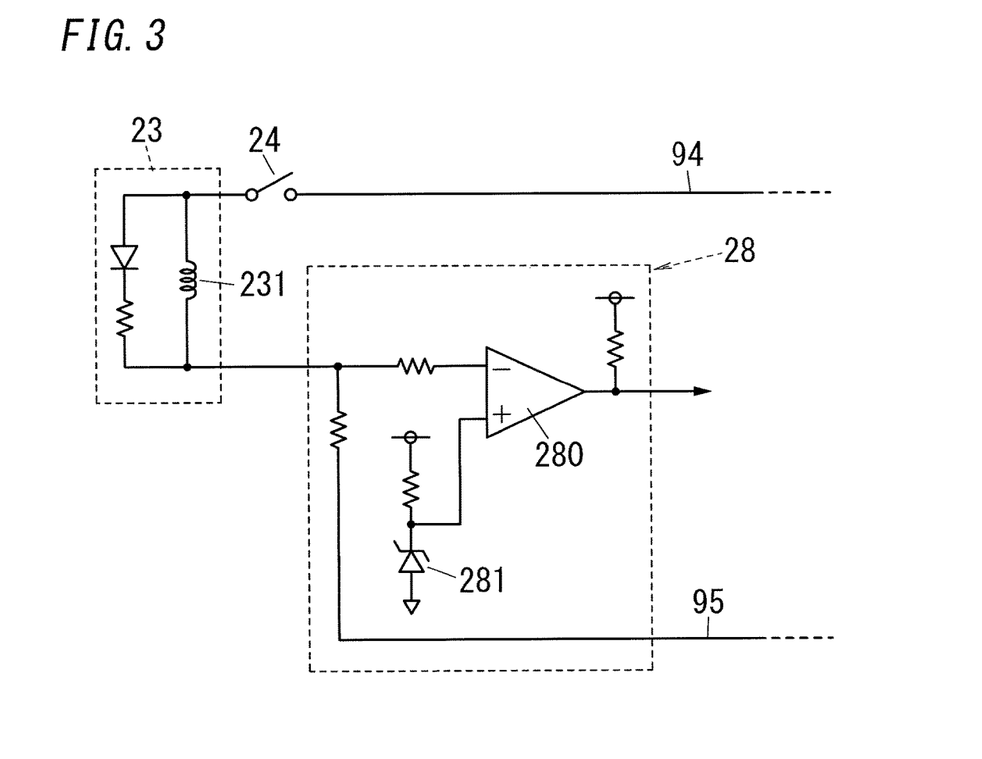
FIG. 3 is a block diagram of a lock mechanism and a connector lock detector in the connector for electrical connection according to the embodiment of the invention.

As shown in FIG. 3, the connector lock detector 28 includes a comparator 280 that is configured to compare a magnitude of the current (drive current) flowing through the coil 231 of the lock mechanism 23 with a magnitude of a reference current (zener current of a zener diode 281), for example. When the lock mechanism 23 is disabled, or when there is no drive current caused by occurrence of a failure such as disconnection (fault lock state), the comparator 280 supplies a high-level output. On the other hand, when the lock mechanism 23 is enabled and is in a normal state (i.e., when the drive current flows through the solenoid 230), the comparator 280 supplies a low-level output. The detection result of the connector lock detector 28 (output of the comparator 280) is supplied to the voltage signal transceiver 33.

The abnormal temperature detector 29 is configured to sense the temperature of the coupler 20 with the temperature sensor 30 that is disposed near the coupler 20, and to output an abnormal temperature detection result to the voltage signal transceiver 33 when detecting that the sensed temperature exceeds a predetermined upper limit. The temperature sensor 30 may include a thermistor. In the connector 1 of the present embodiment, the connector lock detector 28 and the abnormal temperature detector 29 serve as the failure detector configured to detect an occurrence of a failure of the coupler 20.

The voltage signal transceiver 33 is configured to transmit the detection results issued by the connector lock detector 28, the abnormal temperature detector 29 and the contact state detector 31 to the charging-discharging control device 200 by way of adjusting the voltage across the transmission line 93 and the grounding line 95. In the connector 1 of the present embodiment, the voltage signal transceiver 33 serves as the transmitter configured to transmit the detection result of the failure detector to the charging-discharging control device 200 (device) through at least one first electric wire (transmission line 93) of the two or more electric wires. The voltage signal transceiver 33 is configured to receive a control signal that is supplied as a voltage signal from the charging-discharging control device 200, and to control the drive device 32 to operate the emergency trip device 27 to trip (open) the main-contacts 21 based on the control signal.

The power supply filter 34 is configured to remove noise components from a voltage (e.g., 12 V of DC voltage) supplied from the charging-discharging control device 200 through the transmission line 92, and to supply the noise removed voltage to the detectors 28, 29 and 31, the drive device 32 and the voltage signal transceiver 33. The power supply filter 34 is an optional component, and may be omitted.

A charging operation of the charging-discharging system A1 is explained below.

A charging flow starts when the charging-discharging control device 200 receives a charging-start operation after the connector 1 is connected to the inlet 103. The charging-discharging control device 200 applies a predefined voltage (12 V of DC voltage, the same shall apply hereinafter) between the transmission line 92 and the grounding line 95 to supply power to the connector 1 and the electric vehicle 100. The electronic control unit of the electric vehicle 100 is notified the start of the charging flow by receiving the predefined voltage, and then transmits parameters such as a capacity, a maximum voltage and the like of the on-vehicle battery 102 to the charging-discharging control device 200 through the CAN communication.

When receiving the parameters from the electronic control unit of the electric vehicle 100, the charging-discharging control device 200 confirms that the electric vehicle 100 is a chargeable electric vehicle. Then, the charging-discharging control device 200 transmits information regarding a maximum output voltage, a maximum output current and the like of the charging-discharging control device 200 to the electronic control unit of the electric vehicle 100 through the CAN communication.

The electronic control unit of the electric vehicle 100 checks the compatibility of the electric vehicle 100 for the charging-discharging control device 200 based on the information supplied from the charging-discharging control device 200. When there is no problem in the compatibility, the electronic control unit transmits a permission signal for allowing the start of the charging to the charging-discharging control device 200 through the transmission line.

When receiving the permission signal, the charging-discharging control device 200 applies a predefined voltage between the transmission line 94 and the grounding line 95 to cause the drive current to flow through the lock mechanism 23 of the connector 1, thereby enabling the lock mechanism 23. Then, the charging-discharging control device 200 notifies the electronic control unit of the electric vehicle 100 that the charging operation has been ready, through the transmission line.

When receiving the notification from the charging-discharging control device 200, the electronic control unit of the electric vehicle 100 closes the contactors 101 to start charging of the on-vehicle battery 102. When the charged level of the on-vehicle battery 102 reaches a predefined level, the electronic control unit of the electric vehicle 100 transmits a charging stop request through the CAN communication.

When receiving the charging stop request, the charging-discharging control device 200 stops the current output. The electronic control unit of the electric vehicle 100 checks that the current flowing in the main circuit (electrical circuit) 5 is decreased to a predetermined level or less, and then opens the contactors 101 and notifies the charging-discharging control device 200 that the charging has been completed, through the transmission line.

When receiving the notification informing the charging completion, the charging-discharging control device 200 stops applying the predefined voltage between the transmission line 92 and the grounding line 95. Also, the charging-discharging control device 200 stops applying the predefined voltage between the transmission line 94 and the grounding line 95 to disable the lock mechanism 23. The charging flow is thus finished.

A discharging operation of the charging-discharging system A1 is explained below.

A discharging flow starts when the charging-discharging control device 200 receives a discharging-start operation after the connector 1 is connected to the inlet 103. The charging-discharging control device 200 applies a predefined voltage between the transmission line 92 and the grounding line 95 to supply power to the connector 1 and the electric vehicle 100, and also transmits a request for starting the discharging flow through the CAN communication. When receiving the request for starting the discharging flow, the electronic control unit of the electric vehicle 100 transmits parameters such as a capacity, a maximum voltage and the like of the on-vehicle battery 102 to the charging-discharging control device 200 through the CAN communication.

When receiving the parameters from the electronic control unit, the charging-discharging control device 200 applies a predefined voltage between the transmission line 94 and the grounding line 95 to cause the drive current to flow through the lock mechanism 23 of the connector 1, thereby enabling the lock mechanism 23. Then, the charging-discharging control device 200 notifies the electronic control unit of the electric vehicle 100 that the discharging operation has been ready, through the transmission line.

When receiving the notification from the charging-discharging control device 200, the electronic control unit of the electric vehicle 100 closes the contactors 101 to start discharging of the on-vehicle battery 102. When the remaining level of the on-vehicle battery 102 reaches a predetermined lower limit, the electronic control unit of the electric vehicle 100 transmits a discharging stop request through the CAN communication.

When receiving the discharging stop request, the charging-discharging control device 200 stops the operation of the inverter to stop supplying power to a load. The electronic control unit of the electric vehicle 100 checks that the current flowing in the main circuit (electrical circuit) 5 is decreased to the predetermined level or less, and then opens the contactors 101 and notifies the charging-discharging control device 200 that the discharging has been finished, through the transmission line. When receiving the notification informing the finish of the discharging, the charging-discharging control device 200 stops applying the predefined voltage between the transmission line 92 and the grounding line 95. Also, the charging-discharging control device 200 stops applying the predefined voltage between the transmission line 94 and the grounding line 95 to disable the lock mechanism 23. The discharging flow is thus finished.

During the charging flow or the discharging flow described above, if the temperature of the coupler 20 increases abnormally to cause the detection temperature of the temperature sensor 30 to exceed the upper limit, the abnormal temperature detector 29 outputs a detection result informing abnormal temperature to the voltage signal transceiver 33. When receiving the detection result informing abnormal temperature from the abnormal temperature detector 29, the voltage signal transceiver 33 transmits a failure notification signal to the charging-discharging control device 200. The failure notification signal is transmitted as a voltage signal applied between the transmission line 93 and the grounding line 95 (signal voltage level) and having a predetermined level adjusted by the voltage signal transceiver 33.

Also, consider a case that the connector lock detector 28 detects an occurrence of an electrical fault (fault lock state) of the lock mechanism 23 under a state where the charging-discharging control device 200 applies the predefined voltage between the transmission line 94 and the grounding line 95 in the charging flow or the discharging flow. In this case, in response to a high-level output from the connector lock detector 28 that detects the occurrence of the electrical fault, the voltage signal transceiver 33 transmits a failure notification signal informing the occurrence of the electrical fault of the lock mechanism 23 to the charging-discharging control device 200. The failure notification signal is transmitted as a voltage signal applied between the transmission line 93 and the grounding line 95 (signal voltage level) and having a predetermined level adjusted by the voltage signal transceiver 33.

When receiving the failure notification signal from the connector 1, the charging-discharging control device 200 transmits a control signal to the voltage signal transceiver 33. When receiving the control signal, the voltage signal transceiver 33 controls the drive device 32 to operate the emergency trip device 27, thereby tripping (opening) the main-contacts 21. In this way, it is possible to suppress the possibility of occurrence of failure caused by the abnormal temperature increase of the coupler 20 and undesired disconnection of the connector 1 from the inlet caused by the failure of the lock mechanism 23 during charging or discharging.

As described above, in the connector 1 of the present embodiment, the switch mechanism (the main-contacts 21, the open-close mechanism, the emergency trip device 27 and the drive device 32) is configured to open and close the main circuit (electrical circuit) 5 in accordance with the control signal transmitted from the charging-discharging control device 200 through the first electric wire (transmission line 93). That is, the electrical circuit 5 inside the connector 1 which is connected to the inlet 103 of the electric vehicle 100 is to be broken. Accordingly, it is possible to improve the safety when a failure occurs in a state where the energy is discharged from the on-vehicle battery 102 of the electric vehicle 100 to the outside.

Incidentally, the charging-discharging control device 200 is configured to perform the same operation, namely, forcibly open the main-contacts 21, in response to both the abnormal temperature of the coupler 20 and the electrical fault of the lock mechanism 23. It is accordingly preferable that the voltage signal transceiver 33 of the connector 1 be configured to transmit, as one unified signal, the failure notification signal informing the electrical fault of the lock mechanism 23 and the failure notification signal informing the abnormal temperature of the coupler 20, in other words, to transmit the signal with a same signal voltage level in both cases. In other words, the failure detector is preferably configured to detect two or more kinds of failures (the abnormal temperature of the coupler 20, the electrical fault of the lock mechanism 23 and the like) individually. Further, preferably, the voltage signal transceiver 33 (transmitter) is configured to transmit, as one unified result, at least two kinds of failures of the two or more kinds of failures to the charging-discharging control device 200 (device).

In the connector 1 of the present embodiment, the failure detector and the switch mechanism (the drive device 32 in the embodiment) are configured to operate with electric power supplied from the charging-discharging control device 200 through at least one second electric wire (the transmission line 92 and the grounding line 95) of the two or more electric wires. However, the failure detector and the switch mechanism may be configured to operate with electric power supplied through the main circuit (electrical circuit) 5.

In the latter configuration, the failure detector and the switch mechanism receive electric power from the on-vehicle battery 102 and/or the power grid. Therefore, the main circuit (electrical circuit) 5 can be broken even when a high voltage is applied to the main circuit, and thus the safety can be improved. On the other hand, in the former configuration, for example, the failure detector and the switch mechanism can be operated even when the power supply from the on-vehicle battery 102 is failed in the discharging flow. Therefore, the main circuit (electrical circuit) 5 can be broken before energization, and thus the safety can be improved. The former configuration is an option. Also, the latter configuration is an option.

As described above, the connector for electrical connection 1 according to the present embodiment includes the following first feature.

In the first feature, the connector for electrical connection 1 of the present embodiment includes the coupler 20, the cable 9 and the switch mechanism (the main-contacts 21, the mechanical open-close mechanism, the emergency trip device 27 and the drive device 32). Also, the connector for electrical connection 1 of the present embodiment includes the failure detector (the connector lock detector 28 and the abnormal temperature detector 29), the voltage signal transceiver 33 (transmitter) and the connector main body 2 (housing). The coupler 20 is configured to be removably inserted in and connected to the inlet 103 (reception side connector) provided in the electric vehicle 100 (machine) which is equipped with the on-vehicle battery 102 (storage battery). The cable 9 includes the two or more electric wires that include the power lines 90 and 91 configured to be electrically connected to the inlet 103 via the coupler 20. The cable 9 is configured to be connected to the charging-discharging control device 200 (device) that is configured to perform at least one of supplying electric power to the electric vehicle 100 and receiving electric power from the electric vehicle 100. The switch mechanism is configured to open and close the main circuit (electrical circuit) 5 between the coupler 20 and the power lines 90 and 91. The failure detector is configured to detect an occurrence of a failure of the coupler 20. The voltage signal transceiver 33 is configured to transmit information to the charging-discharging control device 200 through the electric wire. The connector main body 2 is provided at an end of the cable 9. The coupler 20, the switch mechanism, the failure detector and the voltage signal transceiver 33 are housed in the connector main body 2. The switch mechanism is configured to open and close the main circuit (electrical circuit) 5 in accordance with a control signal transmitted through the electric wire.

Described in other words, the connector for electrical connection 1 of the present embodiment includes the coupler 20, the cable 9 and the switch mechanism (the main-contacts 21, the mechanical open-close mechanism, the emergency trip device 27 and the drive device 32). Also, the connector for electrical connection 1 of the present embodiment includes the failure detector (the connector lock detector 28 and the abnormal temperature detector 29), the voltage signal transceiver 33 (transmitter) and the connector main body 2 (housing). The coupler 20 is configured to be removably inserted in and connected to the inlet 103 (reception side connector) provided in the electric vehicle 100 (machine) which is equipped with the on-vehicle battery 102 (storage battery). The cable 9 includes the two or more electric wires that include the power lines 90 and 91 configured to be electrically connected to the inlet 103 via the coupler 20. The cable 9 is configured to be connected to the charging-discharging control device 200 (device) that is configured to perform at least one of supplying electric power to the electric vehicle 100 and receiving electric power from the electric vehicle 100. The switch mechanism is configured to open and close the main circuit (electrical circuit) 5 between the coupler 20 and the power lines 90 and 91. The failure detector is configured to detect an occurrence of a failure of the coupler 20. The voltage signal transceiver 33 is configured to transmit a detection result of the failure detector to the charging-discharging control device 200 through at least one first electric wire (transmission line 93) of the two or more electric wires. The connector main body 2 is provided at an end of the cable 9. The coupler 20, the switch mechanism, the failure detector and the voltage signal transceiver 33 are housed in the connector main body 2. The switch mechanism is configured to open and close the main circuit (electrical circuit) 5 in accordance with a control signal transmitted through the transmission line 93.

The connector for electrical connection 1 of the present embodiment may include the following second feature realized in combination with the first feature.

In the second feature, the failure detector is configured to detect two or more kinds of failures (such as the abnormal temperature of the coupler 20 and the electrical fault of the lock mechanism 23) individually. The voltage signal transceiver 33 is configured to transmit, as one unified result, at least two kinds of failures of the two or more kinds of failures to the charging-discharging control device 200.

The connector for electrical connection 1 of the present embodiment may include the following third feature realized in combination with the first or second feature.

In the third feature, the failure detector and the switch mechanism are configured to operate with electric power supplied from the charging-discharging control device 200 through the electric wire.

Described in other words, the failure detector and the switch mechanism are configured to operate with electric power supplied from the charging-discharging control device 200 through at least one second electric wire (the transmission line 92 and the grounding line 95) of the two or more electric wires.

The connector for electrical connection 1 of the present embodiment may include the following fourth feature realized in combination with the first or second feature.

In the fourth feature, the failure detector and the switch mechanism are configured to operate with electric power supplied through the power lines 90 and 91.

Described in other words, the failure detector and the switch mechanism are configured to operate with electric power supplied through the electrical circuit 5.

As described above in the present embodiment, the present invention is configured so that the switch mechanism (the main-contacts 21, the mechanical open-close mechanism, the emergency trip device 27 and the drive device 32) is configured to open and close the main circuit (electrical circuit) 5 in accordance with a control signal transmitted through the first electric wire (transmission line 93). The electrical circuit 5 can be broken at a position near the on-vehicle battery 102 (storage battery), and accordingly the safety can be improved when a failure occurs.

The invention claimed is:

1. A connector for electrical connection, comprising:
   a coupler configured to be removably inserted in and connected to a reception side connector provided in a machine which is equipped with a storage battery;
   a cable comprising two or more electric wires that include a power line configured to be electrically connected to the reception side connector via the coupler, the cable being configured to be connected to a device that is configured to perform at least one of supplying electric power to the machine and receiving electric power from the machine,
   an switch mechanism configured to open and close an electrical circuit between the coupler and the power line,
   a failure detector configured to detect an occurrence of a failure of the coupler,
   a transmitter configured to transmit a detection result of the failure detector to the device through at least one first electric wire of the two or more electric wires, and
   a housing which is provided at an end of the cable and in which the coupler, the switch mechanism, the failure detector and the transmitter are housed,
   the switch mechanism being configured to open and close the electrical circuit in accordance with a control signal transmitted through the first electric wire.

2. The connector of claim 1, wherein
   the failure detector is configured to detect two or more kinds of failures individually, and
   the transmitter is configured to transmit, as one unified result, at least two kinds of failures of the two or more kinds of failures to the device.

3. The connector of claim 1, wherein the failure detector and the switch mechanism are configured to operate with electric power supplied from the device through at least one second electric wire of the two or more electric wires.

4. The connector of claim 1, wherein the failure detector and the switch mechanism are configured to operate with electric power supplied through the electrical circuit.

* * * * *